United States Patent [19]

Böcker et al.

[11] Patent Number: 4,848,238
[45] Date of Patent: Jul. 18, 1989

[54] ACTIVE ELEMENT FOR COMBATING, IN PARTICULAR, ACTIVE ARMORED TARGETS

[75] Inventors: Jürgen Böcker, Oberhausen; Benjamin Furch, Unterlüss, both of Fed. Rep. of Germany; Jörg Pfaehler, Thun, Switzerland; Jörg Peters, Düsseldorf, Fed. Rep. of Germany

[73] Assignee: Rheinmetall GmbH, Düsseldorf, Fed. Rep. of Germany

[21] Appl. No.: 63,604

[22] Filed: Jun. 18, 1987

[30] Foreign Application Priority Data

Jun. 18, 1986 [DE] Fed. Rep. of Germany ......... 361979

[51] Int. Cl.⁴ .............................................. F42B 13/10
[52] U.S. Cl. ..................................... 102/476; 102/310
[58] Field of Search ............... 102/306, 307, 308, 309, 102/310, 476

[56] References Cited

U.S. PATENT DOCUMENTS

| H58 | 5/1986 | Smith et al. |
|---|---|---|
| 2,741,180 | 4/1956 | Meister . |
| 2,910,000 | 10/1959 | Brandt . |
| 2,938,460 | 5/1960 | Brandt . |
| 3,750,582 | 8/1973 | Kintish et al. |
| 4,063,512 | 12/1977 | Davis . |
| 4,102,271 | 7/1978 | Bethmann . |
| 4,567,829 | 2/1986 | Ziemba et al. |
| 4,574,702 | 3/1986 | Brandt . |

FOREIGN PATENT DOCUMENTS

| 0160118 | 8/1984 | European Pat. Off. . |
|---|---|---|
| 0201433 | 12/1986 | European Pat. Off. . |
| 1946991 | 3/1971 | Fed. Rep. of Germany . |
| 2239759 | 3/1973 | Fed. Rep. of Germany . |
| 2827155 | 12/1979 | Fed. Rep. of Germany . |
| 2829002 | 3/1984 | Fed. Rep. of Germany . |
| 3416787 | 11/1984 | Fed. Rep. of Germany . |
| 3601051 | 9/1987 | Fed. Rep. of Germany . |
| 999974 | 2/1952 | France . |
| 2310547 | 5/1975 | France . |
| 2569534 | 3/1986 | France . |

OTHER PUBLICATIONS

Allied Bendix Aerospace Rheinmetall GmbH, Brochure "155 mm Conventional Geometry Smart Projectile", 1985.

Primary Examiner—Charles T. Jordan
Assistant Examiner—Richard Klein
Attorney, Agent, or Firm—Spencer & Frank

[57] ABSTRACT

An active munition element for combatting a target provided with a jamming device, the element including: a front charge; a rear charge mounted behind the front charge and having a hollow charge element; components connected for actuating each charge, the front charge being operative for developing kinetic energy in the target so as to neutralize the jamming device and the rear charge being actuated after the front charge to be effective against the target without interference; and a tube defining a narrow longitudinal channel having a smaller diameter than, and coaxial with, the rear charge, the channel extending forwardly from the rear charge and having a front end region housing the front charge.

8 Claims, 3 Drawing Sheets

ACTIVE ELEMENT FOR COMBATING, IN PARTICULAR, ACTIVE ARMORED TARGETS

BACKGROUND OF THE INVENTION

The present invention relates to an active ammunition element of the type composed of two charges arranged one behind the other.

An element of this type is disclosed, for example, in FRG-OS No. 3,416,787. The two charges have essentially the same diameter and each of them is disposed in a respective housing having stabilizing fins and, after actuation of a separate separating charge, each forms an independent projectile.

The prior art arrangement is not only complicated and requires much space and manufacturing costs, but also includes large amounts of dead weight which are ineffective at the target. These drawbacks become a factor in any kind of use so that there arises the urgent need for improvement.

SUMMARY OF THE INVENTION

It is therefore an object of the invention to provide a device of this type which can be used for many purposes in a space saving manner and has a small percentage of dead weight.

The above and oher objects are achieved, according to the present invention, in an active munition element for combatting a target provided with a jamming device, the element comprising: a front charge; a rear charge element mounted behind the front charge and having a shaped charge; and means connected for actuating each charge, the front charge being operative for developing kinetic energy in the target so as to neutralize the jamming device and the rear charge being actuated after the front charge to be effective against the target without interference, by the improvement wherein the element further comprises means defining a narrow longitudinal channel having a smaller diameter than, and coaxial with, the rear charge, the channel extending forwardly from the rear charge and having a front end region housing the front charge.

The invention will now be described in greater detail with reference to the drawing figures.

Figure 1:
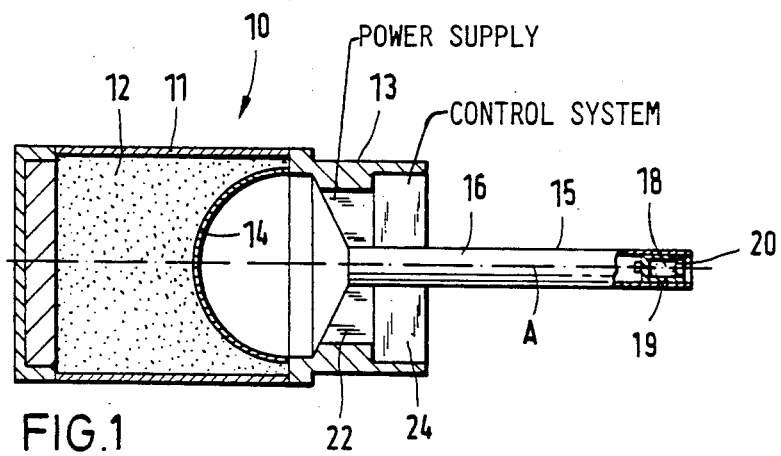
FIG. 1 is a simplified basic illustration, in axial longitudinal section, of an active element according to the invention.
Figure 2:
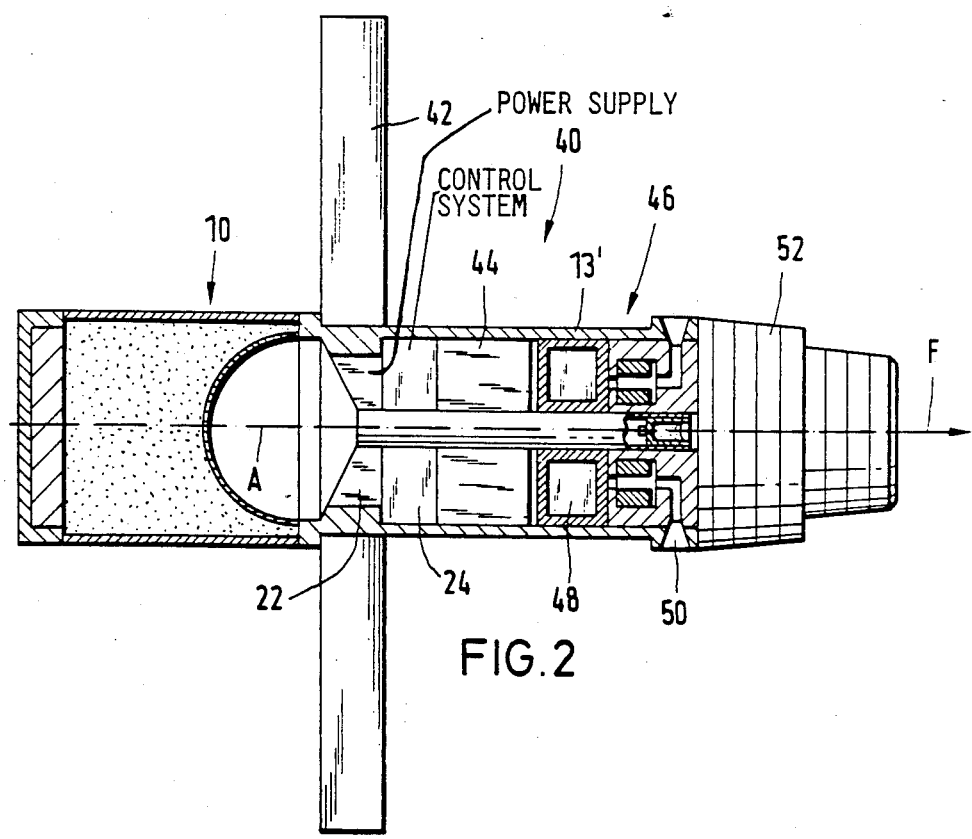
FIG. 2 is a view similar to that of FIG. 1 of a guided warhead which is to be ejected as a secondary projectile from a load carrying projectile and includes the effective element shown in FIG. 1.
Figure 3:
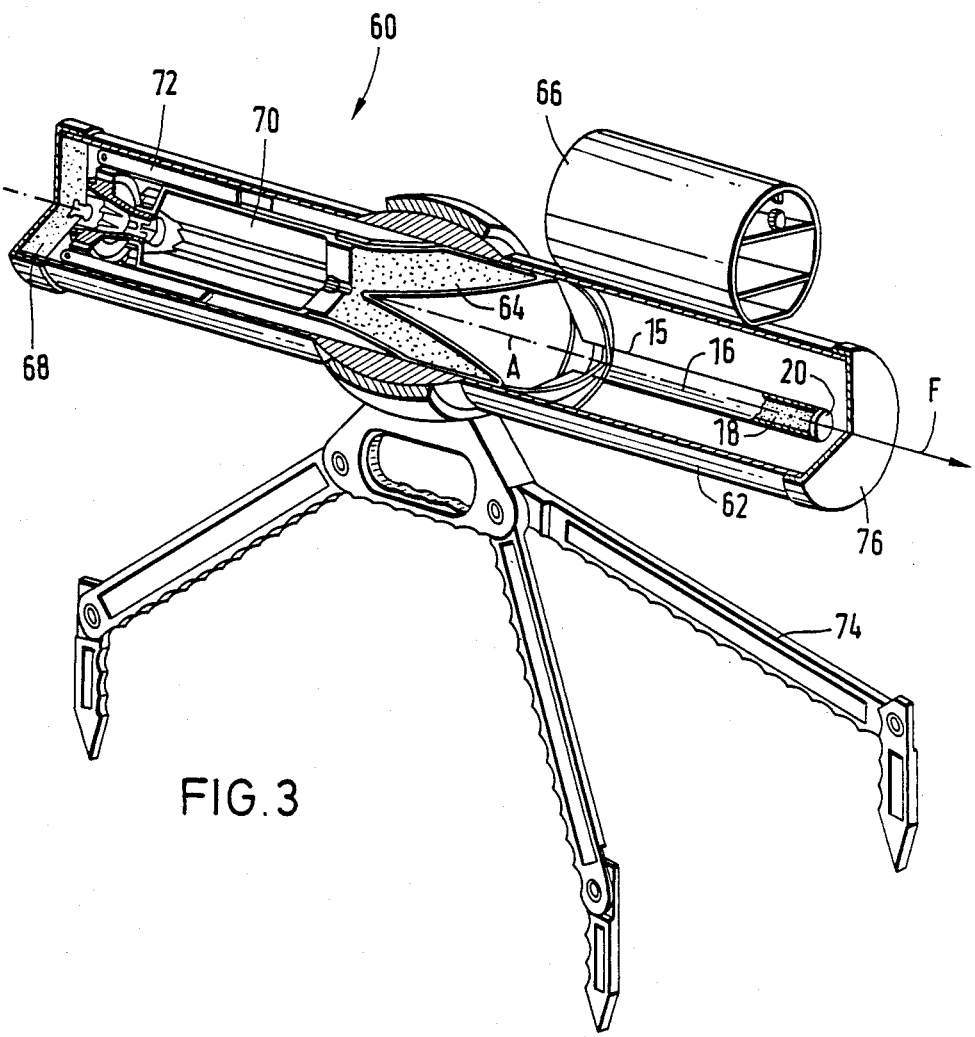
FIG. 3 is a cut-away perspective view of a directional antitank mine employing the active element according to FIG. 1.
Figure 4:
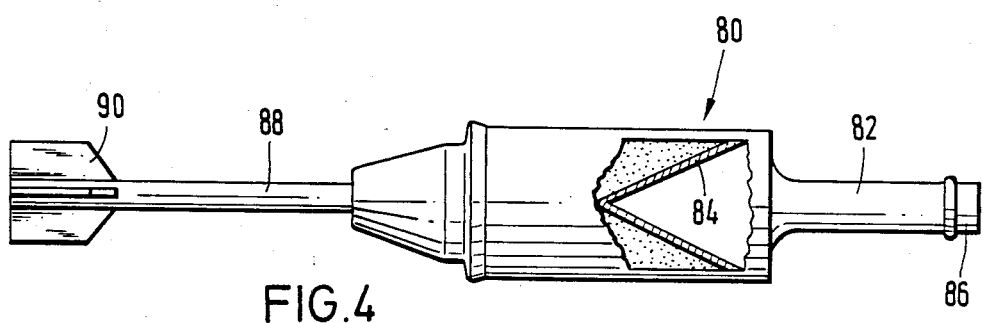
FIG. 4 is a side view, partly cut away, of a full caliber, fin stabilized antitank projectile.

For reasons of better clarity, FIGS. 2, 3 and 4 do not show all the details of the invention which are shown only in FIG. 1.

DESCRIPTION OF THE PREFERRED EMBODIMENTS

Referring to FIG. 1, an active element 10 according to the invention includes a circularly cylindrical body 11 which is axially symmetrical with respect to longitudinal axis A, and an explosive charge 12 contained within body 11. A connecting means 13 is connected to body 11 and serves as a receptacle for power supply devices 22 which supply an electronic control system 24 with current. A tube 15 defines a channel 16 coaxial with axis A for directing therethrough a shaped charge element formed by charge 12 and an insert 14 after actuation of charge 12.

The power supply devices 22 and control system 24 are arranged around channel 16 in order to make active element 10 as compact as possible. This helps to eliminate obstacles which would interfere with the effectiveness on the target of the explosive jet formed by insert 14, or 64 or 84 in FIGS. 3 and 4. Consequently, the role of channel 16 is to ensure that the action of the jet on the target is not obstructed.

In a frontal region of channel 16, tube 15 serves as a receptacle for a charge element 18 composed of an explosive body 19 and a flat, projectile forming insert 20.

Active element 10 is particularly advantageous for combatting, in particular, active, armored targets. When element 10 arrives at a given distance in front of a target, a known proximity fuze (not shown) emits a signal to electronic control system 24. This signal is used to form a first control signal for actuation of the front charge 18, whereupon a projectile formed of flat insert 20 advances toward the target ahead of active element 10.

The impact of the projectile against the target causes a known interference, or jamming, device provided at the target to become effective, and thus to subsequently be made ineffective for the shaped charge element formed from insert 14 of rear charge 12 and actuated by a second control signal. The "unjamming effect" at the target is here realized with space saving means, with the smallest possible amount of dead weight and without the separating charge disclosed in the above-mentioned reference which increases the susceptibility to malfunction of the active element and makes it more complicated.

Figure 5:
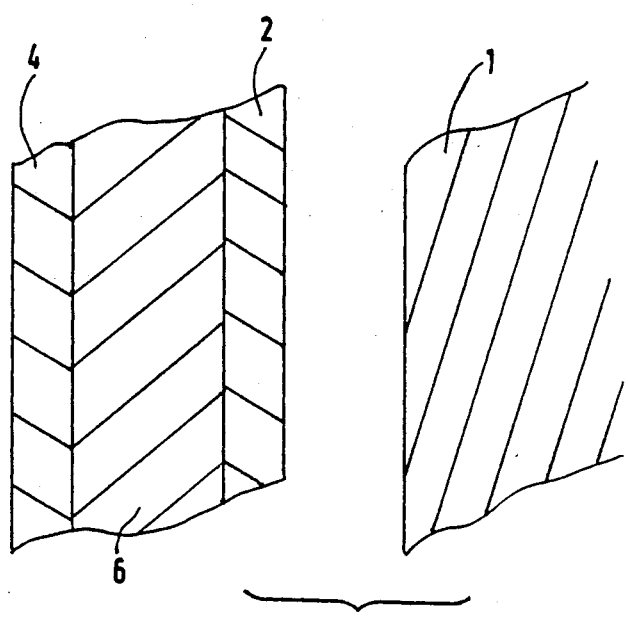
FIG. 5 is a detail view of a portion of an armor body equipped with an exemplary jamming device.

An exemplary jamming device is depicted in FIG. 5, which shows a portion of a main armor body 1 constituting the primary defensive shield of a vehicle, such as a tank. The jamming device is constituted by an outer shell surrounding, and possibly spaced from, body 1. The outer shell is composed of an inner steel sheet 2, an outer steel sheet 4 and a sheet 6 containing or composed of explosive material sandwiched between sheets 2 and 4.

An explosive projectile impacting on the outer shell will detonate the explosive of sheet 6, driving sheets 2 and 4 apart and dissipating the power of the projectile. If the explosive layer is initiated by the jet of a hollow charge, the effectiveness of the hollow charge is highly degraded.

According to the present invention, the explosive of sheet 6 would be detonated by insert, or liner, 20, thereby neutralizing the jamming device before arrival of the rear, or main, charge 12 and insert 14. Rear charge 12 is detonated with a time delay after charge 18 so that a portion of outer steel sheet 4 will have been displaced from the path of the warhead before arrival of main charge 12 at the target. The time delay is selected under consideration of: the angle of impact; the velocity of the warhead; the velocity imparted to outer sheet 4;

the distance between the outer shell and main armor 1; the distance between charges 12 and 18; and the optimal distance between charge 12 and the target at the time of detonation to achieve the greatest possible effect against the main armor. This time delay is typically of the order of 1 ms.

Thus, active elements according to the invention are a form of "intelligent" ammunition having the smallest possible mass. Typically, charge 18 can have a length-/diameter ratio of the order of 1.5:1, while that of element 10 is the order of 3:1–5:1.

The flat insert 20 for front charge 18 is preferably composed of a material having an average density of between about 16 and about 19 g/cm$^3$. Due to the correspondingly high kinetic energy of the projectile formed by explosion from insert 20, the jamming device at the target will be made ineffective with great probability so that the shaped charge element formed by insert 14, can become fully effective. A favorable stand-off can then also be maintained.

The "stand-off" is the distance between a warhead and the target at the moment of detonation of a shaped or hollow charge. The effect of the charge depends on the stand-off, which is an optimum at a distance of about 4 times the diameter of the charge.

Due to the comparatively small size of insert 20, the price for the insert material advantageously need not play a major role so that, for example, the use of tantalum is not impossible with respect to costs.

From consideration of FIGS. 2, 3 and 4 of the drawing, it becomes clear, in connection with the above description, how many uses there are for the active element according to the invention.

According to FIG. 2, the active element 10 is included in a warhead 40 which is ejected from a carrier projectile as a guidable secondary ammunition unit. In this connection, reference is made to a brochure by Allied Bendix Aerospace and Rheinmetall GmbH (assignee), published in October, 1985. The connecting means 13' extends up to a known target seeking head 52 and serves as a receptacle for an electronic system 44 and a control block 46 including gas generators 48 and control nozzles 50, with the above devices being grouped in a space saving manner behind the target seeking head 52 around tube 15 and channel 16. Stabilizing fins 42 can be pivoted in a known manner from a space saving transporting position into their illustrated active position. The direction of flight of warhead 40 and active element 10 is indicated by an arrow F.

According to FIG. 3, active element 10 is slightly modified, particularly with reference, inter alia, to the shape of insert 64) and is integrated in a directional antitank mine 60. Mine 60 includes a firing tube 62 disposed on a tripod mount 74. The central longitudinal axis (not shown) of a known target finding device 66 including necessary electronic control system extends parallel to longitudinal axis A. A rocket engine 70 can be actuated by means of firing device 68. Firing tube 62 is placed by means of mount 74 so that its longitudinal axis is directed toward a region in which armored targets that are to be combatted can be expected. Once target finding device 66 has identified such a target, a signal actuates firing device 68, which fires rocket engine 70. Active element 10 leaves tube 62 in the direction of arrow F after bursting away its cover 76 and stabilizing fins 72 fold out of their rest position shown in the drawing into their active position. With respect to the sequence of functions, reference is made to the description in connection with FIG. 1.

FIG. 4 shows an antitank projectile 80 in the form of an ammunition unit for a cannon. Except for a pointed cone insert 84 for rear charge 12, no details of the integrated active element 10 are shown. A stand-off tube 82 corresponds to tube 15 and is provided, at its front, with a known proximity fuze 86 which is known and therefore is not shown and will not be described, in detail. A known fixed stabilizing guide mechanism 90 is carried by a guide mechanism shaft 88.

The invention now being fully described, it will be apparent to one of ordinary skill in the art that many changes and modifications can be made thereto without departing from the spirit or scope of the invention as set forth herein.

The present disclosure relates to the subject matter disclosed in German Application P No. 36 19 791.2-15 of June 18, 1986, the entire specification of which is incorporated herein by reference.

What is claimed is:

1. An active munition element for combatting a target provided with a jamming device, the munition element comprising:

a shaped front charge element including a front insert and a front charge behind said front insert;

a shaped rear charge element including a rear insert mounted behind said front charge and a rear charge behind said rear insert;

means, including a proximity fuze for igniting said front charge, connected for actuating said front charge at a given distance ahead of the target in order to develop kinetic energy in the target so as to neutralize the jamming device;

means for actuating said rear charge after actuation of said front charge with a given time delay so as to be effective against the target without interference from the jamming device; and a tube means defining a narrow longitudinal channel having a smaller diameter than, and coaxial with, said rear charge element, said channel extending forwardly from said rear insert so as to direct said rear insert therethrough upon actuation of said rear charge, said channel having a front end region housing said front charge.

2. A munition element as defined in claim 1 in combination with, and mounted in, a warhead having a target seeking device.

3. A munition element as defined in claim 1 in combination with, and loaded in, a directional antitank mine.

4. A munition element as defined in claim 1 further comprising an energy source for supplying energy for actuating said charges, and wherein said energy source and said means for actuating each said charge are disposed around the circumference of said tube means.

5. A munition element as defined in claim 1 in combination with a fin stabilized antitank projectile having a subcaliber stand-off tube contaning said means defining a channel.

6. A munition element as defined in claim 1 wherein said front insert comprises a projectile forming element in the form of a body of material having an average density of between about 16 and 19 g/cm$^3$.

7. A munition element as in claim 1, wherein said front element is flat and housed in said front end region of said channel.

8. A munition element as in claim 1, wherein said proximity fuze is disposed in front of said front insert.

* * * * *